(12) United States Patent
Anderson

(10) Patent No.: US 7,180,045 B2
(45) Date of Patent: Feb. 20, 2007

(54) SYSTEM AND METHOD OF ELECTRONIC IMAGE SHIFTING FOR IMAGE STABILIZATION

(76) Inventor: Mark Alan Anderson, 704 Mathews, Fort Collins, CO (US) 80524

( * ) Notice: Subject to any disclaimer, the term of this patent is extended or adjusted under 35 U.S.C. 154(b) by 155 days.

(21) Appl. No.: 11/084,464

(22) Filed: Mar. 17, 2005

(65) Prior Publication Data
US 2006/0208156 A1 Sep. 21, 2006

(51) Int. Cl.
H04N 5/228 (2006.01)

(52) U.S. Cl. .............................. 250/208.1; 348/208.1; 348/208.6

(58) Field of Classification Search ................ 382/195, 382/205; 396/55, 53; 250/208.1; 348/208.4, 348/208.5, 208.6, 208.1; 359/554
See application file for complete search history.

(56) References Cited

U.S. PATENT DOCUMENTS 5,978,600 A * 11/1999 Takeuchi ..................... 396/53
2006/0127071 A1 * 6/2006 Takeuchi ..................... 396/55
2006/0146009 A1 * 7/2006 Syrbe ......................... 345/156

* cited by examiner

Primary Examiner—Thanh X. Luu
Assistant Examiner—Tony Ko

(57) ABSTRACT

An electronic image stabilization system includes an image sensor including an array of photo sensors. Each of the photo sensors accumulates charge responsive to light incident upon the sensor. A motion sensor develops a movement signal responsive to movement of the image stabilization system. A control circuit is coupled to the image sensor and the motion sensor and shifts the charge accumulated in each photo sensor in the array to an adjacent photo sensor responsive to the movement signal.

20 Claims, 5 Drawing Sheets

| $P_{11}$ | $P_{12}$ | $P_{13}$ | $P_{14}$ | $P_{15}$ | $P_{16}$ |
|---|---|---|---|---|---|
| $P_{21}$ | $P_{22}$ | $P_{23}$ ** | $P_{24}$ | $P_{25}$ | $P_{26}$ |
| $P_{31}$ | $P_{32}$ ** | $P_{33}$ ** | $P_{34}$ ** | $P_{35}$ | $P_{36}$ |
| $P_{41}$ | $P_{42}$ | $P_{43}$ ** | $P_{44}$ | $P_{45}$ | $P_{46}$ |
| $P_{51}$ | $P_{52}$ | $P_{53}$ ** | $P_{54}$ | $P_{55}$ | $P_{56}$ |
| $P_{61}$ | $P_{62}$ | $P_{63}$ ** | $P_{64}$ | $P_{65}$ | $P_{66}$ |

FIG. 3

| $P_{11}$ | $P_{12}$ | $P_{13}$ | $P_{14}$ | $P_{15}$ | $P_{16}$ |
|---|---|---|---|---|---|
| $P_{21}$ | $P_{22}$ | $P_{23}$ C ** | $P_{24}$ | $P_{25}$ | $P_{26}$ |
| $P_{31}$ | $P_{32}$ C ** | $P_{33}$ C ** | $P_{34}$ C ** | $P_{35}$ | $P_{36}$ |
| $P_{41}$ | $P_{42}$ | $P_{43}$ C ** | $P_{44}$ | $P_{45}$ | $P_{46}$ |
| $P_{51}$ | $P_{52}$ | $P_{53}$ C ** | $P_{54}$ | $P_{55}$ | $P_{56}$ |
| $P_{61}$ | $P_{62}$ | $P_{63}$ C ** | $P_{64}$ | $P_{65}$ | $P_{66}$ |

FIG. 4

| $P_{11}$ | $P_{12}$ | $P_{13}$ | $P_{14}$ | $P_{15}$ | $P_{16}$ |
|---|---|---|---|---|---|
| $P_{21}$ | $P_{22}$ | $P_{23}$ C | $P_{24}$ ** | $P_{25}$ | $P_{26}$ |
| $P_{31}$ | $P_{32}$ C | $P_{33}$ C ** | $P_{34}$ C ** | $P_{35}$ ** | $P_{36}$ |
| P41 | $P_{42}$ | $P_{43}$ C | $P_{44}$ ** | $P_{45}$ | $P_{46}$ |
| $P_{51}$ | $P_{52}$ | $P_{53}$ C | $P_{54}$ ** | $P_{55}$ | $P_{56}$ |
| $P_{61}$ | $P_{62}$ | $P_{63}$ C | $P_{64}$ ** | $P_{65}$ | $P_{66}$ |

FIG. 5

| $P_{11}$ | $P_{12}$ | $P_{13}$ | $P_{14}$ | $P_{15}$ | $P_{16}$ |
|---|---|---|---|---|---|
| $P_{21}$ | $P_{22}$ | $P_{23}$ | $P_{24}$ C ** | $P_{25}$ | $P_{26}$ |
| $P_{31}$ | $P_{32}$ | $P_{33}$ C ** | $P_{34}$ C ** | $P_{35}$ C ** | $P_{36}$ |
| $P_{41}$ | $P_{42}$ | $P_{43}$ | $P_{44}$ C ** | $P_{45}$ | $P_{46}$ |
| $P_{51}$ | $P_{52}$ | $P_{53}$ | $P_{54}$ C ** | $P_{55}$ | $P_{56}$ |
| $P_{61}$ | $P_{62}$ | $P_{63}$ | $P_{64}$ C ** | $P_{65}$ | $P_{66}$ |

FIG. 6

| $P_{11}$ | $P_{12}$ | $P_{13}$ | $P_{14}$ | $P_{15}$ | $P_{16}$ |
|---|---|---|---|---|---|
| $P_{21}$ | $P_{22}$ | $P_{23}$ | $P_{24}$ CC ** | $P_{25}$ | $P_{26}$ |
| $P_{31}$ | $P_{32}$ | $P_{33}$ CC ** | $P_{34}$ CC ** | $P_{35}$ CC ** | $P_{36}$ |
| $P_{41}$ | $P_{42}$ | $P_{43}$ | $P_{44}$ CC ** | $P_{45}$ | $P_{46}$ |
| $P_{51}$ | $P_{52}$ | $P_{53}$ | $P_{54}$ CC ** | $P_{55}$ | $P_{56}$ |
| $P_{61}$ | $P_{62}$ | $P_{63}$ | $P_{64}$ CC ** | $P_{65}$ | $P_{66}$ |

FIG. 7

| $P_{11}$ | $P_{12}$ | $P_{13}$ | $P_{14}$ | $P_{15}$ | $P_{16}$ |
|---|---|---|---|---|---|
| $P_{21}$ | $P_{22}$ | $P_{23}$ | $P_{24}$ CC | $P_{25}$ | $P_{26}$ |
| $P_{31}$ | $P_{32}$ | $P_{33}$ CC | $P_{34}$ CC | $P_{35}$ CC | $P_{36}$ |
| $P_{41}$ | $P_{42}$ | $P_{43}$ | $P_{44}$ CC | $P_{45}$ | $P_{46}$ |
| $P_{51}$ | $P_{52}$ | $P_{53}$ | $P_{54}$ CC | $P_{55}$ | $P_{56}$ |
| $P_{61}$ | $P_{62}$ | $P_{63}$ | $P_{64}$ CC | $P_{65}$ | $P_{66}$ |

FIG. 8

SYSTEM AND METHOD OF ELECTRONIC IMAGE SHIFTING FOR IMAGE STABILIZATION

BACKGROUND OF THE INVENTION

Digital image capturing devices, such as digital cameras and camcorders, include an optics assembly that directs light from an object onto an image sensor formed by an array of photo sensors arranged in rows and columns. Each of the photo sensors detects the light incident upon that sensor and in response to the detected light the sensor develops an electric charge. In this way, the light from different portions of an image is detected by corresponding photo sensors in the array and the sensors convert the detected light into corresponding electric charges. The stored electric charge in each photo sensor generates a voltage and the device then performs an analog-to-digital conversion to convert the voltage in each sensor into a corresponding digital value. The digital values for each of the sensors collectively form a digital image file that represents the captured image. Each of the photo sensors may sometimes be referred to as a picture element or "pixel" in the following description.

During the capturing of an image, the photo sensors in the array must be exposed to light from the object being imaged for a sufficient amount of time. This time is commonly referred to as an "exposure time" and must have a duration that allows each sensor to develop a sufficient charge which, in turn, develops a voltage having a sufficient magnitude to allow reliable conversion of this analog voltage to a corresponding digital value. In a digital camera this time may be termed an "exposure time" and is set by a shutter that opens and closes. The shutter opens to allow light to propagate through the optics assembly and thereafter closes to block any further light from being incident upon the photo sensors in the array. The time between when the shutter opens and closes is the exposure time.

While the shutter is open, the digital camera or other image capturing device is ideally held perfectly still so that light from given portions of an image is incident upon the same photo sensor in the array. For example, assume the image sensor is formed by a 1024×1024 (1024 rows by 1024 columns) array of photo sensors. During the capture of an image, light from a certain portion of the object being imaged will propagate through the optics assembly and be directed onto corresponding photo sensors in the array. Assume light from the upper right portion of the object is incident upon photo sensors in the upper left portion of the array, with these photo sensors or pixels being designated as $P_{11}$ to $P_{55}$ as shown in FIG. 1. The first number in the subscript indicates the row of the pixel within the array and the second number the column of the pixel. FIG. 1 thus shows a 5×5 array of the pixels $P_{11}$ to $P_{55}$ in the upper left portion of the image sensor.

Assume at the start of the exposure time that light forming an image of a small arrow is incident upon the pixels in column three $P_{13}$ to $P_{53}$ along with the pixels $P_{22}$ and $P_{24}$. This light results in a unit of charge C accumulating in each of the pixels $P_{13}$–$P_{53}$, $P_{22}$ and $P_{24}$. Now assume that during the exposure time, the digital camera is moved by a user of the camera such as may occur when a user depresses a button on the camera to take a picture. Because of this motion, assume that the light forming the image of the arrow is now shifted to the right one pixel as illustrated by an arrow 100 in FIG. 1. The light is then incident upon pixels $P_{14}$–$P_{54}$, $P_{23}$ and $P_{25}$, which results in an additional charge C accumulating in each of these pixels. Light is incident on the pixels $P_{23}$ and $P_{24}$ even after the movement and thus each of these pixels accumulates a charge 2C, which is indicated as two Cs in FIG. 1. Assume the shutter of the camera closes at this point, terminating the exposure time so that the charge on each of the pixels $P_{11}$ to $P_{55}$ is as shown in FIG. 1.

FIG. 1 illustrates that due to the movement of the digital camera during the exposure time, the charge accumulated in the pixels $P_{11}$ to $P_{55}$ is spread among more pixels than would otherwise be the case if no such movement had occurred. This phenomenon is sometimes referred to as "motion induced blurring." The image being capture is "blurred" in that the image is now spread over more pixels than would ideally be the case if no such movement had occurred. Without any movement each of the pixels $P_{13}$–$P_{53}$, $P_{22}$, and $P_{24}$ would accumulate the charge 2C in the example of FIG. 1. Due to the movement, however, this charge is now spread among additional pixels.

Conventional digital image capturing devices like digital cameras utilize a variety of different types of image stabilization systems to compensate for motion induced blurring. The image stabilization system includes a motion sensor that detects movement of the camera in a given direction. Typically the motion sensor is either an accelerometer that detects acceleration of the camera in various directions or a gyroscope that detects movement of the camera in such directions. In response to the detected movement of the camera, the stabilization system controls the optics assembly in the camera to correct for the movement of the camera. The optics assembly corrects for such movement by redirecting light propagating through the optics assembly such that the light continues to be incident on the same pixels in the array after the movement as before the movement. For example, referring to FIG. 1 the image stabilization system controls the optics assembly to redirect the light such that the light is incident upon the pixels in column three $P_{13}$ to $P_{53}$ along with the pixels $P_{22}$ and $P_{24}$ during the entire exposure time.

These conventional image stabilization systems typically control the optics assembly in one of two ways to compensate for camera movement. First, the optics assembly may include two lenses that are optical complements of one another such that the system moves one of these lenses relative to the other to thereby redirect the light, as will be understood by those skilled in the art. Another approach places a flat piece of glass in the propagation path of the light and rotates this piece of glass to redirect the light due to the change in refraction of the light passing through the glass as the glass is rotated. Both types of image stabilization systems are mechanical systems in that components in the optics assembly are being physically moved to compensate for movement of the camera. As a result, such systems are prone to failure as components wear out or fail. In addition, the size and mass of components being controlled limits the speed of operation of these image stabilization systems. This may result in unwanted motion induced blurring due to the response time of the image stabilization system being too slow to compensate for some types of movements.

There is a need for an image stabilization system having a reduced rate of failure and improved response time to compensate for a wider range of movements.

SUMMARY OF THE INVENTION

According to one aspect of the present invention, an electronic image stabilization system includes an image sensor including an array of photo sensors. Each of the photo sensors accumulates charge responsive to light incident upon the sensor. A motion sensor develops a movement signal responsive to movement of the image stabilization system. A control circuit is coupled to the image sensor and the motion sensor and shifts the charge accumulated in each photo sensor in the array to an adjacent photo sensor responsive to the movement signal.

BRIEF DESCRIPTION OF THE DRAWINGS

FIGS. 3–8 illustrate the operation of the electronic image stabilization system of FIG. 2 in shifting accumulated charge in pixels of an image sensor to compensate for movement during the capturing of an image.

DETAILED DESCRIPTION OF PREFERRED EMBODIMENTS

Figure 1:
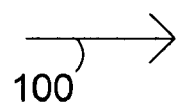
FIG. 1 illustrates a portion of an image sensor showing the variation in the accumulated charge developed in pixels of the sensor caused by movement of the array during the capturing of an image.
Figure 2:
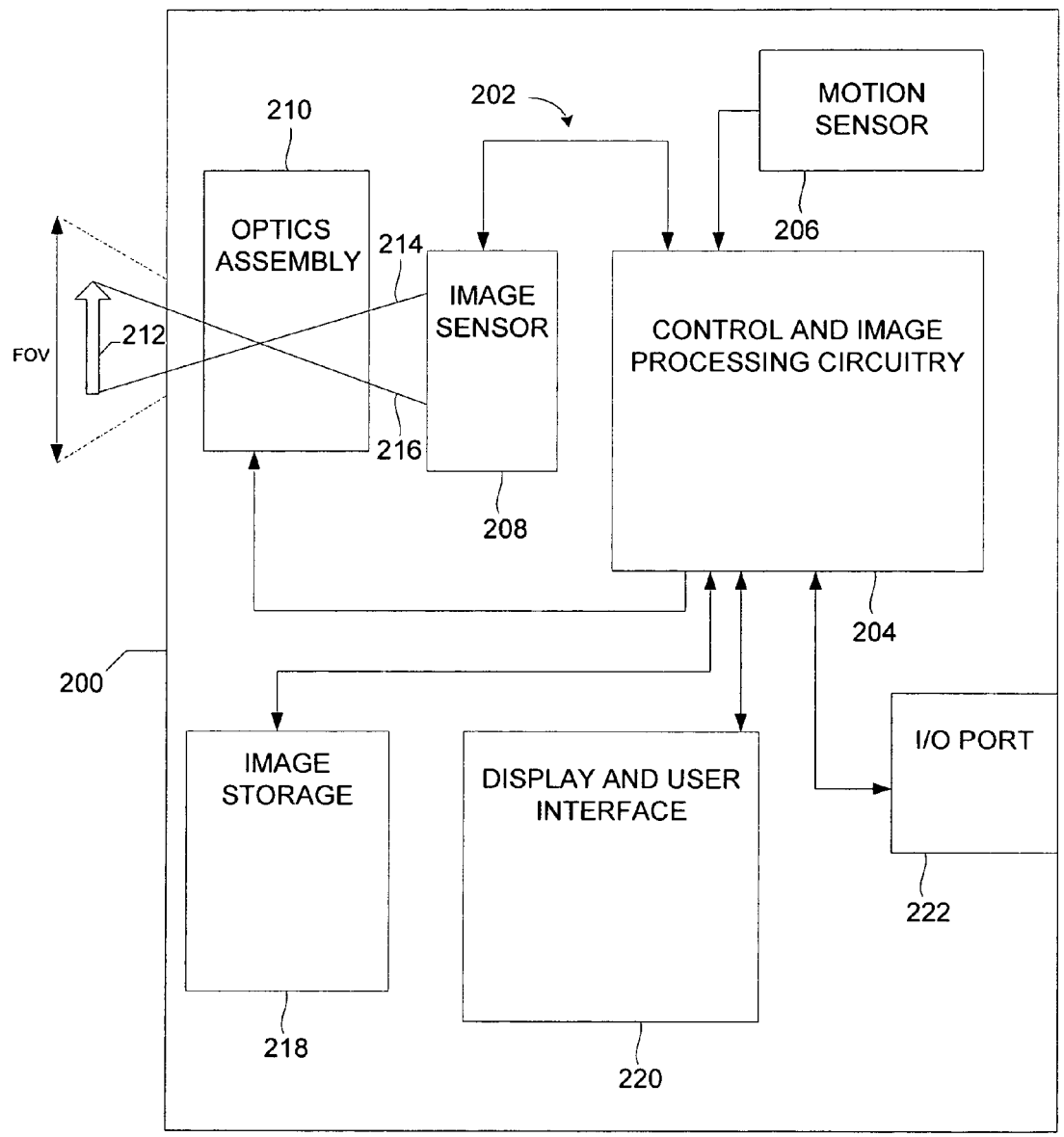
FIG. 2 is a functional block diagram of a digital image capturing device including an electronic image stabilization system according to one embodiment of the present invention.

FIG. 2 is a functional block diagram of a digital image capturing device 200 including an electronic image stabilization system 202 according to one embodiment of the present invention. The electronic image stabilization system 202 includes control and image processing circuitry 204 coupled to a motion sensor 206 to receive a movement signal indicating movement of the device 200. The control and image processing circuitry 204 is also coupled to an image sensor 208 to control the image sensor during the capturing of an image. In operation, the control and image processing circuitry 204 controls the image sensor 208 in response to the movement signal from the motion sensor 206 to shift charge accumulated in individual photo sensors (not shown) of the sensor during the capturing an image. The control and image processing circuitry 204 shifts charge stored in each of these photo sensors to compensate for movement of the device 200 during the capturing of an image and in this way reduces motion induced blur, as will be described in more detail below. Compensation is purely electronic with the system 202 and in this way eliminates the need for mechanical stabilization systems that are prone to failure and have limited response times.

In the following description, certain details are set forth in conjunction with the described embodiments of the present invention to provide a sufficient understanding of the present invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. Finally, the operation of well known components and/or processes has not been shown or described in detail below to avoid unnecessarily obscuring the present invention.

The digital image capturing device 200 further includes an optics assembly 210 positioned adjacent the image sensor 208 to direct light of an image being captured onto the image sensor. FIG. 2 illustrates an object being imaged, which in this example is an "up-arrow" 212, positioned within a field of view (FOV) of the optics assembly 210. The optics assembly 210 directs light corresponding to the image of the up-arrow 212 onto the image sensor 208 as illustrated by rays 214 and 216. The optics assembly 210 also includes other components such as a shutter which opens or closes responsive to control signals from the circuitry 204 to direct or block light from the up-arrow 212 to the image sensor 208.

The image sensor 208 includes an array of photo sensors (not shown) arranged in rows and columns, with each photo sensor being operable to convert light incident upon that sensor into electrons and thereby into an electric charge stored in the sensor. Light from different portions of an image is detected by corresponding photo sensors in the array and the photo sensors convert the detected light into corresponding electric charges. The stored electric charge in each photo sensor generates a voltage and the control and image processing circuitry 204 then performs an analog-to-digital conversion to convert the voltage in each sensor into a corresponding digital value. Alternatively, the image sensor 204 may include circuitry for performing this analog-to-digital conversion, as will be appreciated by those skilled in the art. In case, the control and image processing circuitry 204 stores the digital values from each of the photo sensors in an image storage component 218, such as a FLASH memory. The digital values from all photo sensors in the array collectively form a digital image file.

The image sensor 208 is further operable to shift the accumulated charge in each photo sensor or pixel to an adjacent pixel in the array under the control of the processing circuitry 204. In one embodiment, the control and image processing circuitry 204 applies row shift signals to the image sensor 208 to shift the accumulated charge in the pixels in each row of the array to either the next pixel to the left or the next pixel to the right in that row. This will be termed a "row shift" in the present description. In another embodiment, the control and image processing circuitry 204 applies column shift signals to the image sensor 208 in addition to the row shift signals. In response to the column shift signals, the image sensor 208 shifts the accumulated charge in each pixel in each column of the array to either the next pixel to top or the next pixel to the bottom in that same column. This will be termed a "column shift" in the present description. The operation of the image circuitry 204 and image sensor 208 during row and column shifts will be described in more detail below.

A display and user interface 220 is coupled to the control and image processing circuitry 204 and functions to display selected digital image files store in the image storage component 218. The interface 220 also includes input controls such as buttons and switches that allow a user of the device 200 to provide input to the device. In response to these input controls the interface 220 supplies corresponding controls signals to the circuitry 204 which, in turn, controls the overall operation of the device 200 accordingly. For example, input controls on the interface 220 typically include a power ON/OFF button, and in response to a user depressing this button the circuitry 204 activates all components in the device 200. An input/output (I/O) output port 222 allows the circuitry 204 to transfer digital image files to and from the image storage component 218. Digital image files captured by the device 200 and stored on the image storage component 218 can be uploaded via the circuitry 204 and I/O port 222 to a computer. Conversely, digital image files stored on a computer can be downloaded via the I/O port 222 and circuitry 204 to the image storage component 218.

In operation, to commence capturing an image a user typically presses a button on the interface 220 which, in turn, provides a corresponding signal to the circuitry 204. In response to this signal, the circuitry 204 applies control signals to the optics assembly 210 which, in turn, opens the shutter to start the exposure time of the image being captured. When the shutter in the optics assembly 210 opens, light propagates through the optics assembly and is incident upon pixels in the array of the image sensor 208. At this point, the pixels in the array of the image sensor 208 accumulate charge as a function of the intensity of the light incident upon each pixel. In this way, the sensor 208 begins capturing the desired image.

As previously described, the device 200 is ideally held perfectly still by the user during the entire exposure time. The motion sensor 206 detects any movement of the device 200 during this time and develops the movement signal in response to any such detected movement. In response to the movement signal, the circuitry 204 applies the shift signals to shift the charge stored in the pixels of the image sensor 208 to compensate for the detected movement. The operation of the circuitry 204 and image sensor 208 in compensating for movement of the device 200 will now be described in more detail with reference to FIGS. 3–8. FIGS. 3–8 illustrate the operation of the electronic image stabilization system 202 in shifting accumulated charge in pixels of the image sensor 208 to compensate for movement of the device during the exposure time (i.e., during the capturing of an image). In the following description, the device 200 is assumed to be capturing an image of the up-arrow 212 shown in FIG. 2.

FIG. 3 is a diagram showing pixels designated $P_{11}$–$P_{66}$ in the array of pixels in the image sensor 208. In the example of FIGS. 3–8, selected ones of the pixels $P_{11}$–$P_{66}$ are assumed to be the pixels in the array that are illuminated by light corresponding to the image of the up-arrow 212 (FIG. 2) being captured. FIG. 3 shows the pixels at time the start of the exposure time, when light corresponding to the image of the up-arrow 212 is first incident upon the pixels $P_{23}$, $P_{32}$–$P_{34}$, and $P_{43}$–$P_{63}$ in the array. At this point, these pixels begin accumulating charge in response to the incident light, as indicated by the charge C in each of the pixels $P_{23}$, $P_{32}$–$P_{34}$, and $P_{43}$–$P_{63}$ in FIG. 4.

Now assume that the device 200 moves after the start of the accumulation of charge by the pixels $P_{23}$, $P_{32}$–$P_{34}$, and $P_{43}$–$P_{63}$. As a result of this movement, light from the image corresponding to the up arrow 212 is now shifted to the right one pixel and is incident upon new pixels $P_{24}$, $P_{33}$–$P_{35}$, and $P_{44}$–$P_{64}$ as shown in FIG. 5. As a result, charge would now start accumulating in the pixels $P_{24}$, $P_{33}$–$P_{35}$, and $P_{44}$–$P_{64}$ if no compensation for this movement is performed. With image stabilization system 202, however, the control and image processing circuitry 204 detects this movement of the device 200 in response to the movement signal from the motion sensor 206.

The movement signal indicates the magnitude and direction of movement of the device 200. From this magnitude and direction information of the movement signal, the circuitry 204 determines the magnitude and direction that the accumulated charge stored in the pixels $P_{11}$–$P_{66}$ must be shifted to compensate for this movement. In the example of FIG. 5, the circuitry 204 determines the accumulated charge stored in the pixels $P_{11}$–$P_{66}$ must be shifted to the right one pixel to compensate for the movement of device 200. At this point, the circuitry 204 applies row shift signals to the image sensor 208 which, in turn, shifts the previously accumulated charge stored in the pixels $P_{11}$–$P_{66}$ to the right one pixel as shown in FIG. 6. In this way, the previously accumulated charge C stored in the pixels $P_{23}$, $P_{32}$–$P_{34}$, and $P_{43}$–$P_{63}$ (see FIG. 4) for the image of the up-arrow 212 is shifted to the pixels $P_{24}$, $P_{33}$–$P_{35}$, and $P_{44}$–$P_{64}$, which are the pixels now receiving light corresponding to the image of the up-arrow as previously discussed with reference to FIG. 5.

At this point, the stabilization system 202 has compensated for movement of the device 200 after the start of the exposure time. As shown in FIG. 7, all charge C accumulated to this point in time is now stored in pixels $P_{24}$, $P_{33}$–$P_{35}$, and $P_{44}$–$P_{64}$, which are the pixels now receiving light of the image of the up-arrow 212 being captured. FIG. 7 shows a total charge of 2C accumulated in each of the pixels $P_{24}$, $P_{33}$–$P_{35}$, and $P_{44}$–$P_{64}$ to this point in time. This is the total charge accumulated since the start of the exposure time and is properly stored in pixels in that collectively correspond to the proper shape of the image being captured, namely the up-arrow 212. The exposure time is now assumed to terminate, and the circuitry 204 applies controls signals to the optics assembly 210 to close the shutter and prevent any further light from the image of the up-arrow 212 from illuminating the image sensor 208. FIG. 8 shows the accumulated charge of 2C stored in the pixels $P_{24}$, $P_{33}$–$P_{35}$, and $P_{44}$–$P_{64}$ upon termination of the exposure time.

After termination of the exposure time, the circuitry 204 or image sensor 208 performs an analog-to-digital conversion on the voltages of each of the pixels stored in each of the $P_{11}$–$P_{66}$ to thereby generate a digital file corresponding to the captured image of the up-arrow 212. The circuitry 204 then stores this digital file in the image storage component 218. The circuitry 204 may also supply the digital file to the interface 220 which utilizes the digital file to display the captured image to the user.

The electronic image stabilization system 202 compensates for movement of the device 200 during the exposure time of an image being captured. This compensation is purely electronic with the system 202 and is done by shifting accumulated charge in the pixels of the image sensor 208, and in this way eliminates the need for mechanical stabilization systems that are prone to failure and have limited response times. Note that although the example of FIGS. 3–8 shows the accumulated charge being shifted only one pixel to the right, depending on the extent of movement of the device 200 the circuitry 204 may shift the charge by more than one pixel in any given direction. Also, depending on the duration of the exposure time, multiple shifts of accumulated charge may occur during the exposure time to compensate for continued movement of the device 200.

The description of the overall operation of the system 202 with reference to FIGS. 3–8 illustrates a row shift in which the accumulated charge stored in each pixel in each row of the sensor 208 is shifted to the adjacent pixels to the left or right, depending on the detected direction of motion of the device 200. In another embodiment, the circuitry 204 and image sensor 208 also work in combination to perform a column shift to compensate for vertical movement of the device 200. When the motion sensor 206 detects vertical movement of the device 200, the circuitry 204 applies column shift signals to the image sensor 208 to shift the accumulated charge stored in each pixel in each column of the image sensor to the adjacent pixel to either the top or bottom of that pixel the same column.

In another embodiment, the electronic image stabilization system 202 performs row shifts to compensate for horizontal movement of the device 200 and the optics assembly 210 further includes mechanical stabilization components that operate under control of the circuitry 204 to compensate for vertical movement of the device 200. In this embodiment this operation could be reversed, of course, with the system 202 controlling column shifts and the mechanical stabilization components controlling horizontal movement compensation. The image stabilization system 202 may only perform either row shifts or column shifts in another embodiment of the present invention. For example, motion induced blur may be more likely to occur in only one direction, requiring either only either a row shift or a column shift. In this situation, the image stabilization system 202 only performs row or column shifts to compensate for movement in the determined most likely direction.

The terms vertical and horizontal are used broadly herein and assume the image sensor 208 is positioned with its rows of pixels oriented horizontally and its columns of pixels oriented vertically. Moreover, the motion sensor 206 must also be positioned to detect movement in the horizontal direction, and also in the vertical direction when both row and column shifting are to be implemented. Where the motion sensor 206 is an accelerometer, one accelerometer has an axis of sensitivity positioned horizontally, where the axis of sensitivity is the axis along which acceleration is sensed. A second accelerometer is contained in the motion sensor 206 with the access of sensitivity of this second accelerometer positioned vertically. Note that when the motion sensor 206 is an accelerometer the sensor generates the movement signal indicating acceleration of the device 200 along the given axis (horizontal or vertical) and the magnitude and polarity of the movement signal indicate the extent and direction of movement, respectively. For example, a positive magnitude may indicate movement of the device 200 to the left while a negative magnitude indicates movement to the right, with the absolute value of this magnitude indicating the extent of the movement.

The image sensor 208 may be any type of suitable sensor, such as a charge-coupled device (CCD) image sensor or a complementary metal oxide semiconductor (CMOS) image sensor. The accumulated charge in each pixel of the image sensor 208 may be sensed in different ways depending upon whether the sensor is a CCD or a CMOS image sensor. The specific way in which this is done is not important to the present description and thus, for the sake of brevity, will not be described in more detail. The way in which such accumulated charge is sensed, however, may make a CCD type image sensor well suited to being utilized in an embodiment of the present invention. A CCD sensor includes circuitry for shifting the accumulated charge stored the pixels of array in a given direction as part of the process of reading data out of a CCD sensor, which will be understood by those skilled in the art. This shifting normally occurs in one direction for conventional CCD sensors, which is all that is required for a horizontal only shifting embodiment of the present invention. Where both horizontal and vertical shifting is desired, one skilled in the art will appreciate suitable circuitry for modifying a conventional CCD sensor to perform both vertical and horizontal shifts.

The image sensor 208 may also be a color sensor in one embodiment of the present invention, and likely would be in many applications. Where the image sensor 208 is a color image sensor, pixels in the array typically are designed to sense either red, green, or blue light incident upon the sensor. In this situation, the image stabilization system 202 performs row and/or column shifts to adjacent pixels of the same color. For example, if movement of the device 200 requires shifting of the image to the right one pixel, then the accumulated charge of each red pixel is shifted to the next red pixel to the right, the accumulated charge of each green pixel is shifted to the next green pixel to the right, and the accumulated charge of each blue pixel is shifted to the next blue pixel to the right.

Even though various embodiments and advantages of the present invention have been set forth in the foregoing description, the above disclosure is illustrative only, and changes may be made in detail and yet remain within the broad principles of the present invention. Moreover, the functions performed by components 204–222 in the device 200 generally, and more specifically components of the electronic image stabilization system 202 can be combined to be performed by fewer elements, separated and performed by more elements, or combined into different functional blocks depending upon the specific application of the stabilization system, as will appreciated by those skilled in the art. Therefore, the present invention is to be limited only by the following claims.

What is claimed is:

1. An electronic image stabilization system, comprising:
an image sensor including an array of photo sensors, each of the photo sensors operable to accumulate charge responsive to light incident upon the sensor;
a motion sensor operable to develop a movement signal responsive to movement of the image stabilization system; and
a control circuit coupled to the image sensor and the motion sensor, the control circuit operable to shift the charge accumulated in each photo sensor to an adjacent photo sensor in the array responsive to the movement signal.

2. The electronic image stabilization system of claim 1, wherein the photo sensors are arranged in rows and columns;
wherein the motion sensor develops the movement signal including a first component indicating movement of the system in a first direction; and
wherein the control circuit is operable to shift the accumulated charge of each photo sensor in each row of the array to one of the adjacent photo sensors in that row responsive to the first component of the movement signal.

3. The electronic image stabilization system of claim 2, wherein the motion sensor is further operable to develop the movement signal including a second component indicating movement of the system in a second direction direction; and
wherein the control circuit is further operable to generate optics control signals responsive to the second component of the movement signal, the optics control signals being adapted to control an optics assembly to shift light incident upon the image sensor in the second direction.

4. The electronic image stabilization system of claim 2, wherein the motion sensor is further operable to develop the movement signal including a second component indicating movement of the system in a second direction; and
wherein the control circuit is further operable to shift the accumulated charge of each photo sensor in each column of the array to one of the adjacent photo sensors in that column responsive to the second component of the movement signal.

5. The electronic image stabilization system of claim 4 wherein the first direction comprises a substantially horizontal direction and the second direction comprises a substantially vertical direction.

6. The electronic image stabilization system of claim 1 wherein the image sensor comprises a CMOS sensor.

7. The electronic image stabilization system of claim 1 wherein the image sensor comprises a CCD sensor.

8. The electronic image stabilization system of claim 1 wherein the motion sensor comprises an accelerometer.

9. The electronic image stabilization system of claim 1 wherein the motion sensor comprises a gyroscope.

10. A digital image capturing device, comprising:
- an image sensor including an array of photo sensors, each of the photo sensors operable to accumulate charge responsive to light incident upon the sensor;
- an optics assembly positioned adjacent the image sensor to direct light onto the image sensor;
- a motion sensor operable to develop a movement signal responsive to movement of the image capturing device;
- an image memory operable to store digital files corresponding to captured images;
- a display and user interface component operable to display user information and adapted to receive user inputs and develop user input signals responsive to the user inputs;
- a control circuit coupled to the image sensor and the motion sensor, the control circuit operable to shift the charge accumulated in each photo sensor to an adjacent photo sensor in the array responsive to the movement signal.

11. The digital image capturing device of claim 10 wherein the digital image capturing device comprises a digital camera and/or a camcorder.

12. The digital image capturing device of claim 10 further comprising an input/output port coupled to the control circuit and wherein the control circuit is further operable to control the transfer of digital files through the input/output port to and from the image memory.

13. The digital image capturing device of claim 10 wherein the motion sensor comprises one of an accelerometer and a gyroscope.

14. The electronic image stabilization system of claim 10 wherein the image sensor comprises either a CMOS sensor or a CCD sensor.

15. A method of capturing an image in an image sensor including an array of photo sensors, each of the photo sensors accumulating charge responsive to light illuminating the sensor, the method comprising:
- exposing the array to light corresponding to an image being captured;
- detecting movement of the image sensor during such exposing; and
- upon detecting movement of the image sensor, shifting accumulated charge in each photo sensor to one of the adjacent photo sensors in the array.

16. The method of claim 15 wherein detecting movement of the array comprises detecting acceleration of the array.

17. The method of claim 15 wherein the photo sensors are arranged in rows and columns, and wherein shifting accumulated charge in each photo sensor to one of the adjacent photo sensors in the array comprises shifting charge of each photo sensor in each row of the array to one of the adjacent photo sensors in that row.

18. The method of claim 17 wherein the number of sensors by which the accumulated charge of each pixel is shifted is a function of a magnitude of the detected movement.

19. The method of claim 18 wherein the direction in which the accumulated charge of each pixel is shifted is a function of a polarity of the detected movement.

20. The method of claim 15 wherein the photo sensors are arranged in rows and columns, and wherein shifting accumulated charge in each photo sensor to one of the adjacent photo sensors in the array comprises shifting charge of each photo sensor in each column of the array to one of the adjacent photo sensors in that column.

* * * * *

UNITED STATES PATENT AND TRADEMARK OFFICE
CERTIFICATE OF CORRECTION

PATENT NO.        : 7,180,045 B2                                            Page 1 of 1
APPLICATION NO.   : 11/084464
DATED             : February 20, 2007
INVENTOR(S)       : Mark Anderson It is certified that error appears in the above-identified patent and that said Letters Patent is hereby corrected as shown below:

Col. 8, Line 50-51:
In Claim 3, delete "direction direction;" and insert -- direction; --, therefor.

Signed and Sealed this

Twelfth Day of August, 2008

JON W. DUDAS
*Director of the United States Patent and Trademark Office*